(12) United States Patent
Kato

(10) Patent No.: US 9,488,257 B2
(45) Date of Patent: Nov. 8, 2016

(54) CAM DEVICE

(71) Applicant: Techno Dynamics Inc., Shizuoka (JP)

(72) Inventor: Heizaburo Kato, Shizuoka (JP)

(73) Assignee: TECHNO DYNAMICS INC., Shizuoka (JP)

(*) Notice: Subject to any disclaimer, the term of this patent is extended or adjusted under 35 U.S.C. 154(b) by 0 days.

(21) Appl. No.: 13/633,392

(22) Filed: Oct. 2, 2012

(65) Prior Publication Data

US 2013/0081510 A1   Apr. 4, 2013

(30) Foreign Application Priority Data

Oct. 3, 2011   (JP) ................................ 2011-219441

(51) Int. Cl.
| | |
|---|---|
| *F16H 3/06* | (2006.01) |
| *F16H 25/24* | (2006.01) |
| *F16H 25/22* | (2006.01) |
| *B23Q 5/34* | (2006.01) |

(52) U.S. Cl.
CPC .......... *F16H 25/2409* (2013.01); *B23Q 5/341* (2013.01); *F16H 25/2261* (2013.01); *Y10T 74/2107* (2015.01)

(58) Field of Classification Search
CPC  F16H 25/2409; F16H 25/2261; B23Q 5/341
USPC .............................. 74/89.23, 424.6, 409, 425
See application file for complete search history.

(56) References Cited

U.S. PATENT DOCUMENTS

| | | | | |
|---|---|---|---|---|
| 3,448,631 | A | * | 6/1969 | Sullivan ........................ 74/409 |
| 3,659,474 | A | * | 5/1972 | Neugebauer ................ 74/424.6 |
| 4,898,044 | A | * | 2/1990 | Galloway .................... 74/424.6 |
| 2004/0144191 | A1 | * | 7/2004 | Kato .............................. 74/425 |

FOREIGN PATENT DOCUMENTS

| | | |
|---|---|---|
| CN | 1500591 A | 6/2004 |
| CN | 101214623 A | 7/2008 |
| CN | 201320684 Y | 10/2009 |
| DE | 1 935 428 A1 | 2/1971 |
| EP | 0 366 594 A2 | 5/1990 |
| EP | 1 413 387 B1 | 1/2006 |

(Continued)

OTHER PUBLICATIONS

Extended European Search Report issued in European Application No. 12186878.0 dated Dec. 18, 212.

(Continued)

*Primary Examiner* — William Kelleher
*Assistant Examiner* — Zakaria Elahmadi
(74) *Attorney, Agent, or Firm* — McDermott Will & Emery LLP

(57) ABSTRACT

A cam device includes a first member including a plurality of cam followers arranged in a row direction and a second member including a rotatable cam with an engaging groove, on an outer circumferential surface thereof, to be engaged with the cam followers, the second member moving relatively with respect to the first member in the row direction by rotating the cam and making the plurality of the cam followers engage successively in the engaging groove, wherein the second member includes a gear that rotates the cam by engaging with the cam, and second teeth that mesh with first teeth of the gear are provided on the outer circumferential surface of the cam.

3 Claims, 16 Drawing Sheets

(56) References Cited

FOREIGN PATENT DOCUMENTS

| FR | 2 535 426 A1 | 5/1984 |
| JP | 2004-162912 A | 6/2004 |
| JP | 4538212 B2 | 9/2010 |
| TW | I236396 B | 7/2005 |

OTHER PUBLICATIONS

Communication pursuant to Article 94(3) EPC European Patent Application No. 12 186 878.0-1752 dated Sep. 26, 2014.

Office Action Japanese Patent Application No. 2011-219441 dated Dec. 1, 2015.

Office Action Chinese Patent Application No. 201210377218.X dated May 27, 2015.

Office Action Taiwanese Patent Application No. 101136497 dated Mar. 9, 2016 with full English translation.

Office Action Japanese Patent Application No. 2011-219441 dated May 12, 2015.

Notification of the First Office Action Chinese Patent Application No. 201210377218.X dated Jan. 7, 2015 with full English translation.

Office Action Taiwan Patent Application No. 101136497 dated Jul. 13, 2016 with English translation.

\* cited by examiner

CAM DEVICE

CROSS-REFERENCE TO RELATED APPLICATIONS

The present application claims priority upon Japanese Patent Application No. 2011-219441 filed on Oct. 3, 2011, which is herein incorporated by reference.

BACKGROUND

1. Technical Field

The present invention relates to cam devices.

2. Related Art

A cam device that includes a first member such as a base including a plurality of cam followers arranged in a direction of row, and a second member such as a movable member including a rotatable cam with engaging grooves on its outer circumferential surface to be engaged with the cam followers is already well known. In such a cam device, the second member is made to move relatively with respect to the first member in the row direction by rotating the cam and making the plurality of the cam followers engage successively in the engaging grooves (Japanese Patent No. 4538212).

By the way, in the above-mentioned cam device, there was an issue that transfer stiffness decreases due to the necessity of a large power to rotate the cam.

SUMMARY

The present invention has been made in view of the above issue. An advantage of some aspects of the present invention is to realize a cam device with high transfer stiffness.

An aspect of the invention for solving the above-mentioned problem is a cam device including:

a first member including a plurality of cam followers arranged in a row direction; and a second member including a rotatable cam with an engaging groove, on an outer circumferential surface thereof, to be engaged with the cam followers, the second member moving relatively with respect to the first member in the row direction by rotating the cam and making the plurality of the cam followers engage successively in the engaging grooves, wherein the second member includes a gear that rotates the cam by engaging with the cam, and second teeth that mesh with first teeth of the gear are provided on the outer circumferential surface of the cam.

Other features of the present invention will be made clear through the description of the present specification and the accompanying drawings.

BRIEF DESCRIPTION OF THE DRAWINGS

For a more complete understanding of the present invention and the advantages thereof, reference is now made to the following description taken in conjunction with the accompanying drawings wherein:

FIG. 4 is a cross-sectional view showing a state in which pinion gear teeth 44 and cylindrical cam teeth 35 are meshed with each other, and the like;

DESCRIPTION OF EXEMPLARY EMBODIMENTS

At least the following matters will become clear through the description of the present specification and the accompanying drawings.

A cam device includes a first member including a plurality of cam followers arranged in a row direction; and a second member including a rotatable cam with an engaging groove, on an outer circumferential surface thereof, to be engaged with the cam followers, the second member moving relatively with respect to the first member in the row direction by rotating the cam and making the plurality of the cam followers engage successively in the engaging groove, wherein the second member includes a gear that rotates the cam by engaging with the cam, and second teeth that mesh with first teeth of the gear are provided on the outer circumferential surface of the cam.

In such a case, a cam device with high transfer stiffness for transferring a driving force is achieved.

Also, the second member includes a motor to rotate the cam by driving the gear, an axial direction of a central axis of the cam and an axial direction of a central axis of the motor are along the row direction, and a shortest distance from the cam followers to the central axis of the motor is larger than that from the cam followers to the central axis of the cam.

In such a case, restrictions when selecting motors are reduced.

Also, the first member includes two cam follower rows each having the plurality of cam followers arranged in the row direction, and the two cam follower rows guide the relative movement of the second member.

In such a case, a cam device having an efficient configuration can be achieved.

Also, the first member includes a cam follower row having the plurality of cam followers arranged in the row direction, the first member is configured to be divisible into a plurality of segments, and each of the plurality of segments includes a sub cam follower row belonging to the cam follower row.

In such a case, it becomes possible to provide a flexible first member.

===Regarding a Configuration of a Cam Device 10===

Figure 1:
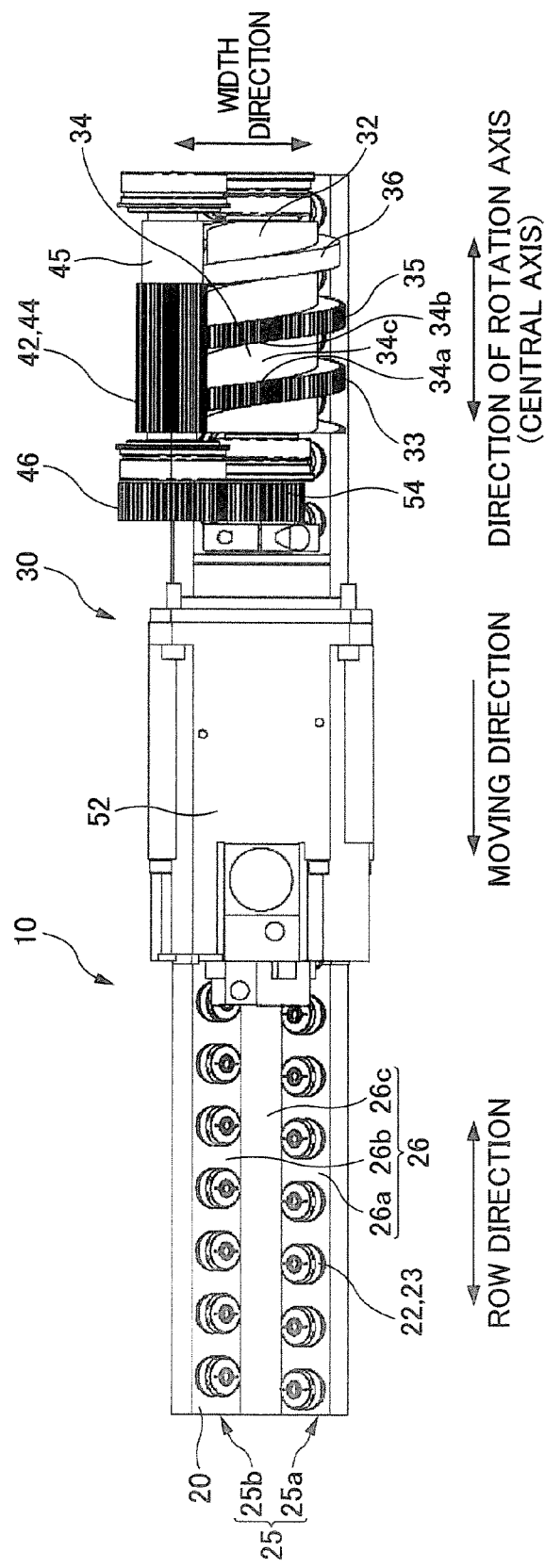
FIG. 1 is a top view of a cam device 10.
Figure 2:
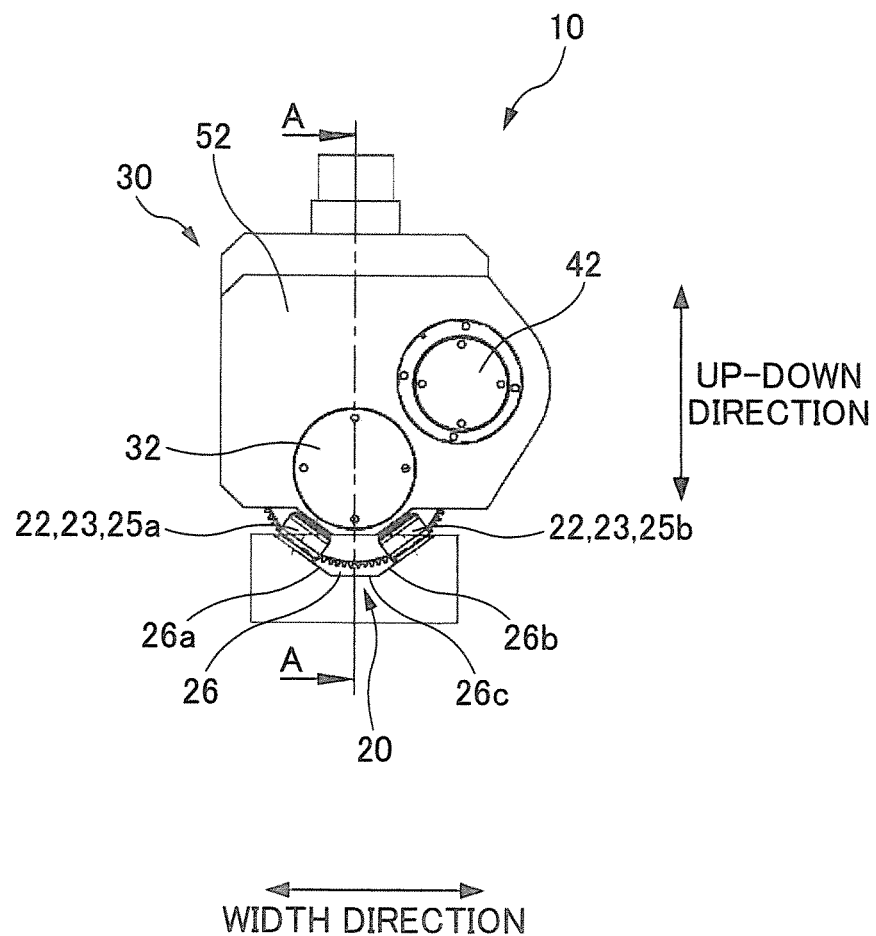
FIG. 2 is a side view of the cam device 10.
Figure 3:
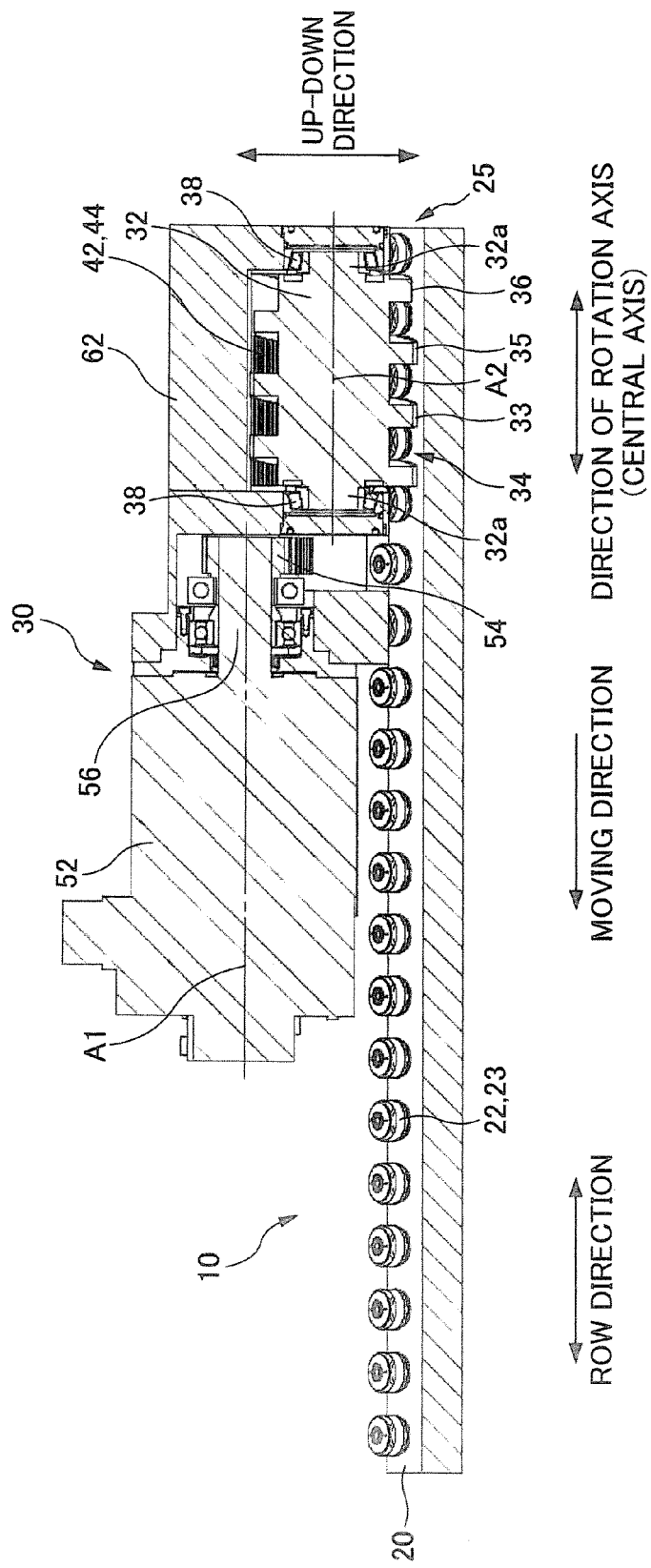
FIG. 3 is a cross-sectional view taken along line A-A in FIG. 2.
Figure 4:
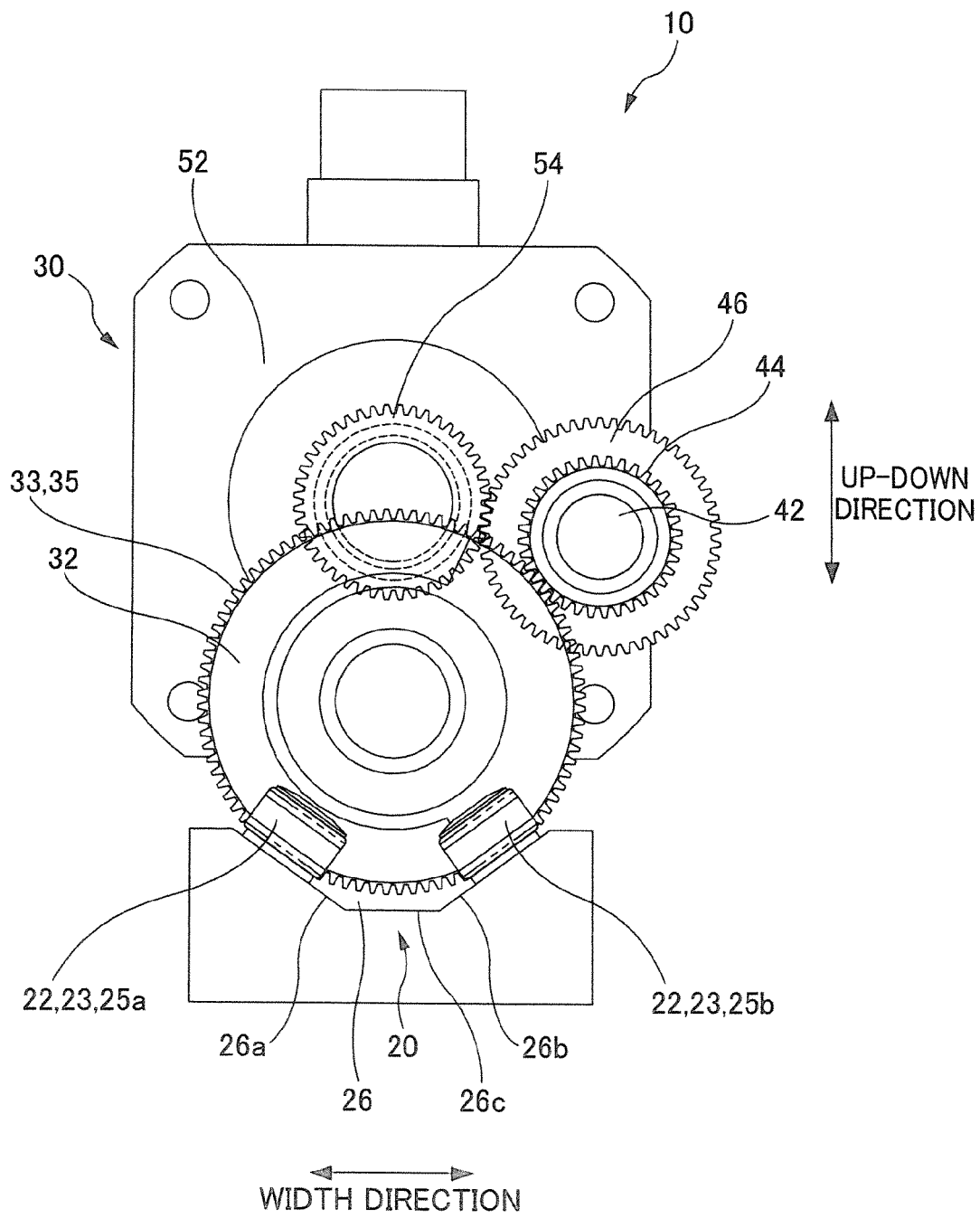

Here, a configuration of a cam device 10 will be described with reference to FIGS. 1 to 4. FIG. 1 is a top view of the cam device 10. FIG. 2 is a side view of the cam device 10. FIG. 3 is a cross-sectional view taken along line A-A in FIG. 2. FIG. 4 is a cross-sectional view showing a state in which pinion gear teeth 44 and cylindrical cam teeth 35 are meshed with each other, and the like.

The cam device 10 includes a base 20 as an example of a first member and a movable member 30 as an example of a second member (in the present embodiment, a linear roller screw; note that a form will be described later in which the movable member 30 includes a member with a guiding function in addition to the linear roller screw). The cam device 10 is configured so that the movable member 30 that is a second member can move relatively with respect to the base 20 that is a first member (in the present embodiment, the movable member 30 moves in an absolute manner).

The base 20 is fixedly installed on a floor, and a top surface thereof is horizontal. This base 20 includes cam followers 22 and functions to hold the cam followers 22.

The cam followers 22 are for moving the movable member 30 with respect to the base 20 by cooperating with the cylindrical cam 32 described later.

The cam follower 22 is of a known construction having a substantially cylindrical stud which serves as a rotation axis for rolling (hereinafter, referred to as a rolling axis), and a cylindrical outer ring 23 covering one end of the stud through a needle bearing.

Also, the other end of the stud is externally threaded. The externally threaded part of the stud is screwed in and fastened to the top surface of the base 20, so that the cam follower 22 is fixed in an erect state on the top surface of the base 20 as shown in FIG. 3. Further, in this fixed state, the outer ring 23 is able to rotate about the rolling axis.

There are provided a plurality of these cam followers 22, and the plurality of cam followers 22 are arranged in the row direction as shown in FIG. 1. That is, the plurality of cam followers 22 are arranged at equal intervals in a straight line with their rolling axes extended parallel to each other, and the plurality of cam followers 22 arranged in the straight line form one cam follower row 25.

Also, in the present embodiment, as shown in FIGS. 1 and 2, two such cam follower rows 25 (i.e., two rows) are provided in which the plurality of cam followers 22 are arranged in the row direction (two cam follower rows 25 are referred to as a first cam follower row 25a, and a second cam follower row 25b, respectively). That is, in the present embodiment, the configuration of the cam followers 22 is a so-called multiple-row arrangement, and therefore, the movable member 30 is a so-called multiple-row movable member (multiple-row linear roller screw).

More specifically, as shown in FIG. 2, a groove 26 including two lateral sections (a first lateral section 26a and a second lateral section 26b) and a bottom section 26c is formed on the top surface of the base 20. A first cam follower row 25a (cam followers belonging thereto) and a second cam follower row 25b (cam followers 22 belonging thereto) are fixed in an erect state on the two lateral sections (the first lateral section 26a and the second lateral section 26b), respectively. Thus, as is clearly understood from FIG. 2, in a state in which the direction of the rolling axes of the cam followers 22 belonging to the first cam follower row 25a and the direction of the rolling axes of the cam followers 22 belonging to the second cam follower row 25b intersect each other, the first cam follower row 25a and the second cam follower row 25b are arranged on the groove 26.

The movable member 30 has a cylindrical cam 32 as an example of a cam, a pinion gear 42 as an example of a gear, a servo motor 52 as an example of a motor, and a housing 62 for receiving those members.

The cylindrical cam 32 is for moving the movable member 30 with respect to the base 20 by cooperating with the above-mentioned cam followers 22.

This cylindrical cam 32 is a rotatable columnar body as shown in FIG. 1. Both ends 32a in the direction of the axis of rotation (direction of the central axis) of the cylindrical cam 32, as shown in FIG. 3, are rotatably supported in the housing 62 through bearing members 38 such as ball bearings, tapered roller bearings or the like. In addition, the cylindrical cam 32 includes engaging grooves 34 on the outer circumferential surface 33, in which the cam followers 22 are to be engaged.

As shown in FIG. 1, this engaging groove 34 is a helical groove, and is formed to extend across an entire length of the cylindrical cam 32, in the direction of the axis of rotation (direction of the central axis) of the cylindrical cam 32. Also, one end of the engaging groove 34 in the direction of the axis of rotation (direction of the central axis) functions as a front guide part for guiding the cam followers 22 into the engaging groove 34, and the other end thereof functions as a back guide part for guiding the cam followers 22 out of the engaging groove 34, respectively.

In addition, the cylindrical cam 32 rotates and the plurality of cam followers 22 are engaged successively into the engaging grooves 34, so that the movable member 30 moves linearly and relatively with respect to the base 20 in the row direction (thus, the moving direction is along the row direction). That is to say, when the cylindrical cam 32 rotates, the cam followers 22 are successively inserted from the front guide part into the engaging groove 34 and guided in the direction of the axis of rotation (direction of the central axis), then approaches the back guide part. Therefore, the cam followers 22 (the base 20 on which they are arranged) and the cylindrical cam 32 (the movable member 30 including the cam 32) move linearly relative to each other. However, in the present embodiment, since the base 20 is fixedly installed on the floor, the base 20 does not move, and only the movable member 30 moves linearly.

Note that, as shown in FIG. 1, the engaging groove 34 includes a pair of inner side surfaces opposing each other (a first inner side surface 34a and a second inner side surface 34b) and a bottom surface 34c connecting these inner side surfaces. When the cam followers 22 are guided in the direction of the axis of rotation (direction of the central axis) in the engaging groove 34 by the rotation of the cylindrical cam 32, the first inner surface 34a and the second inner surface 34b function as rolling surfaces, i.e., the outer ring 23 of the cam follower 22 comes into contact with one of the first inner surface 34a or the second inner surface 34b, so that the cam follower 22 rolls thereon.

Furthermore, as shown in FIGS. 1 and 4, the outer circumferential surface 33 of the cylindrical cam 32 (more specifically, sections which are not provided with the engaging groove 34 on the outer circumferential surface 33) is provided with teeth (which correspond to the second teeth. For convenience of description, they are hereinafter referred to as cylindrical cam teeth 35) that mesh with teeth of the pinion gear 42 described below (which correspond to the first teeth. For convenience of description, they are hereinafter referred to as pinion gear teeth 44). Note that in the present embodiment, not all of the sections which are not provided with the engaging grooves 34 on the outer circumferential surface 33 have the cylindrical cam teeth 35. That is to say, the outer circumferential surface 33 includes a section provided with the engaging grooves 34, a section provided with the cylindrical cam teeth 35, and a section provided with neither the engaging groove 34 nor the cylindrical cam teeth 35 (for convenience of description, referred to as a cylindrical cam non-processed section 36) (see FIG. 1).

Also, in order to achieve the above-mentioned linear movement of the movable member 30, as shown in FIGS. 1 and 2, the cylindrical cam 32 is positioned above the cam followers 22 so that the direction of the central axis of the cam (direction that corresponds to the axial direction of the central axis of the cam) is along the row direction.

Also, the helical shape of the engaging groove 34 in the cylindrical cam 32 can be appropriately adjusted according to the movement pattern of the movable member 30. For example, when the movable member 30 is made to move linearly at a constant speed by rotating the cylindrical cam 32 at a constant speed, the helical shape of the engaging groove 34 may be formed as an equal-displacement curve in which the groove position in the direction of the rotation axis (direction of the central axis) is displaced in direct proportion to an amount of rotation of the cylindrical cam 32. Also, when the movable member 30 is made to move intermittently, that is, when the movable member 30 is made to linearly move and stop repetitively by rotating the cylindrical cam 32 at a constant speed, in the predetermined position of the engaging groove 34, a groove with a shape such that the groove position is not displaced in the direction of the rotation axis (direction of the central axis) even when the cam 32 is rotated may be provided.

The pinion gear 42 is for rotating the cylindrical cam 32 by engaging with the cylindrical cam 32.

This pinion gear 42 has pinion gear teeth 44 on its outer circumferential surface. As shown in FIGS. 1 and 4, the pinion gear 42 is installed so that the direction of the rotation axis (direction of the central axis) of the pinion gear 42 is along the direction of the rotation axis (direction of the central axis) of the cylindrical cam 32, in a state in which the pinion gear teeth 44 and the cylindrical cam teeth 35 are meshed with each other.

Also, in the present embodiment, as shown in FIG. 4, the pinion gear 42 is mounted in a position that is not directly above the cylindrical cam 32 but is slightly displaced in a width direction and a downward direction from the directly above position, in order to make the size of the movable member 30 small (in other words, the engagement position in which the pinion gear teeth 44 and the cylindrical cam teeth 35 are meshed with each other is provided in a position that is not directly above the cylindrical cam 32 but is slightly displaced in a width direction and a downward direction from the directly above position).

Also, as shown in FIGS. 1 and 4, the pinion gear 42 is coaxially coupled to a first variable-speed gear 46 that rotates integrally with the pinion gear 42 and transmits a driving force of a servo motor 52 to the pinion gear 42. The first variable-speed gear 46 receives the driving force of the servo motor 52 from a second variable-speed gear 54 and transmit s this driving force to the pinion gear 42 by engaging teeth of the first variable-speed gear 46 with teeth of the second variable-speed gear 54 described later.

Note that, as shown in FIG. 1, in terms of convenience of processing and the like, the pinion gear 42 is not provided on an entire surface with the pinion gear teeth 44, and there is a section (for convenience of description, referred to as a pinion gear non-processed section 45) that is not provided with the pinion gear teeth 44 on the opposite end section of the first variable-speed gear 46 of the pinion gear 42 in the direction of the rotation axis (direction of the central axis). Therefore, as described above, the outer circumferential surface 33 of the cylindrical cam 32 has the cylindrical cam non-processed section 36.

The servo motor 52 is for rotating the cylindrical cam 32 by driving the pinion gear 42. As shown in FIG. 3, an output shaft 56 is coupled to this servo motor 52. Further, as shown in FIGS. 1 and 4, the output shaft 56 is coaxially coupled to the second variable-speed gear 54 that rotates integrally with the output shaft 56 and transmits driving force of the servo motor 52 to the pinion gear 42. These members (the servo motor 52, the output shaft 56, and the second variable-speed gear 54) are mounted so that the axial direction of the central axis (shown by reference character A1 in FIG. 3) of the motor (this is also an axial direction of the output shaft 56) is along the row direction.

As described above, the second variable-speed gear 54 engages with the first variable-speed gear 46 by meshing its teeth with the teeth of the first variable-speed gear 46. Therefore, the second variable-speed gear 54 transmits the driving force of the servo motor 52 to the first variable-speed gear 46.

Note that, reasons will be described later, but in the present embodiment, as can be clearly understood from FIG. 3, a shortest distance from the cam followers 22 to the central axis of the motor (shown by reference character A1 in FIG. 3) is larger than that from the cam followers 22 to the central axis of the cam (shown by reference character A2 in FIG. 3).

Next, the motion of the cam device 10 configured in this manner will be described.

When the output shaft 56 and the second variable-speed gear 54 are driven by the rotation of the servo motor 52, the output shaft 56 and the second variable-speed gear 54 rotate. When the second variable-speed gear 54 rotates, the first variable-speed gear 46 engaging therewith rotates, and the pinion gear 42 connecting thereto also rotates. Then, when the pinion gear 42 rotates, the cylindrical cam 32 engaging therewith rotates. Then, when the cylindrical cam 32 rotates, a plurality of the cam followers 22 are engaged successively in the engaging groove 34, so that the movable member 30 moves linearly with respect to the base 20 in the row direction.

In this way, the driving force of the servo motor 52 is transmitted to the cylindrical cam 32, through the output shaft 56, the second variable-speed gear 54, the first variable-speed gear 46, and the pinion gear 42, and the cylindrical cam 32 that has received the driving force rotates, therefore the movable member 30 moves linearly.

Note that, when the driving force is transmitted from the second variable-speed gear 54 to the first variable-speed gear 46, and when the driving force is transmitted from the pinion gear 42 to the cylindrical cam 32, deceleration occurs.

===Regarding Effectiveness of the Cam Device 10 of the Present Embodiment===

As described above, the cam device 10 of the present embodiment includes the base 20 with the plurality of cam followers 22 arranged in the row direction, and the movable member 30 having the rotatable cylindrical cam 32 with the engaging groove 34 on its outer circumferential surface 33 to be engaged with the cam followers 22. The movable member 30 moves relatively with respect to the base 20 in the row direction by rotating the cylindrical cam 32 and making the plurality of cam followers 22 engage successively in the engaging groove 34. The movable member 30 includes the pinion gear 42 for rotating the cylindrical cam 32 by engaging with the cylindrical cam 32, and the cylindrical cam teeth 35 that mesh with the pinion gear teeth 44 of the pinion gear 42 are provided on the outer circumferential surface 33 of the cylindrical cam 32. Therefore, the cam device 10 with high transfer stiffness can be achieved.

Figure 5:
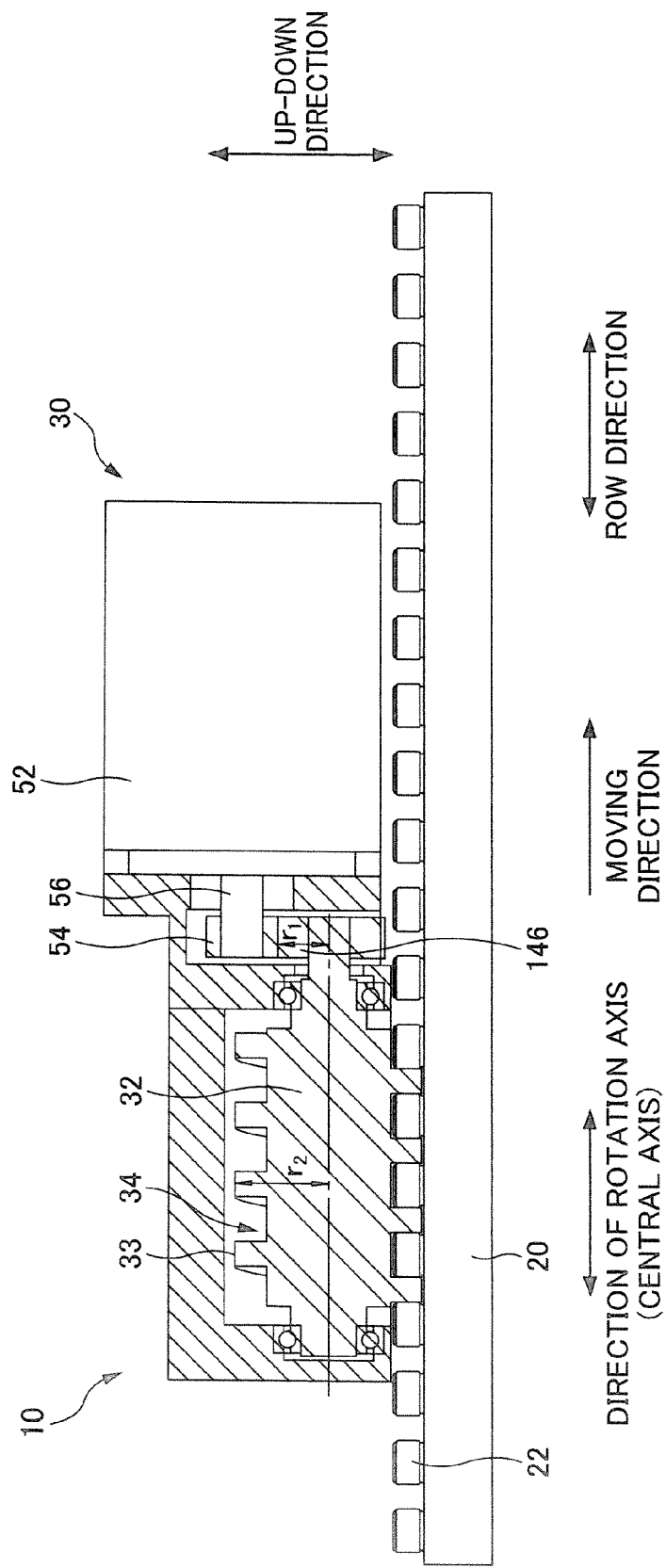
FIG. 5 is a cross-sectional view of a cam device 10 according to a first comparative example.

As to the above description, FIG. 5 will be used for explanation by comparing the cam device 10 of the present embodiment (also referred to as the present example) with the cam device 10 of the conventional example (referred to as a first comparative example). FIG. 5 corresponds to FIG. 3 and is a cross-sectional view of the cam device 10 of the first comparative example.

As shown in FIG. 5, as with the cam device 10 of the present embodiment, the cam device 10 of the first comparative example includes a base 20 with a plurality of cam followers 22 arranged in the row direction, and a movable member 30 having a rotatable cylindrical cam 32 with an engaging groove 34 on its outer circumferential surface 33 to be engaged with the cam followers 22, the movable member 30 moving relatively with respect to the base 20 in the row direction by rotating the cylindrical cam 32 and making the plurality of cam followers 22 engage successively in the engaging groove 34.

However, different from the cam device 10 of the present embodiment, in the cam device 10 according to the first comparative example, the outer circumferential surface 33 of the cylindrical cam 32 is not provided with the cylindrical cam teeth, therefore, the pinion gear provided in the present example is also not mounted.

More specifically, in the first comparative example, as shown in FIG. 5, a first variable-speed gear 146 that rotates integrally with the cylindrical cam 32 is coupled coaxially thereto, and the first variable-speed gear 146 engages with the second variable-speed gear 54 by meshing its teeth with the teeth of the second variable-speed gear 54 described above. Therefore, in the first comparative example, the cylindrical cam 32 does not receive driving force of the servo motor 52 from the pinion gear 42 by meshing of the pinion gear teeth 44 and the cylindrical cam teeth 35. Instead, the first variable-speed gear 146 provided coaxially to the cylindrical cam 32 receives the driving force of the servo motor 52 from the second variable-speed gear 54, with the meshing of the teeth of the first variable-speed gear 146 and the teeth of the second variable-speed gear 54.

That is, when comparing the present example with the first comparative example, there is a difference in positions where the cylindrical cam 32 receives the driving force. That is, in the present example while the outer circumferential surface 33 of the cylindrical cam 32 (in other words, the cylindrical cam teeth 35) receives the driving force, in the first comparative example the outer circumferential surface of the first variable-speed gear 146 provided coaxially to the cylindrical cam 32 receives the driving force.

Due to such a difference, the present example has superiority over the first comparative example. In order to explain this superiority, first, each radius (distance from the central axis to the outer circumferential surface) of the first variable-speed gear 146 and the cylindrical cam 32 is focused on. The radius of the first variable-speed gear 146 (shown by $r_2$ in FIG. 5) is required to be a small enough value so as not to physically interfere with the cam followers 22. If the radius of the first variable-speed gear 146 is made the same as that of the cylindrical cam 32 (shown by $r_2$ in FIG. 5), the first variable-speed gear 146 physically interferes with the cam followers 22. Therefore, the radius of the first variable-speed gear 146 inevitably needs to be smaller than that of the cylindrical cam 32.

Moreover, in the first comparative example in which the outer circumferential surface of the first variable-speed gear 146 receives the driving force, since the distance from the central axis that functions as a supporting point to the outer circumferential surface that functions as a point of action which receives power is short, a large amount of power is necessary to rotate the cylindrical cam 32. Therefore, a problem that the transfer stiffness for transmitting driving force becomes low may occur.

On the other hand, in the present example, the cylindrical cam teeth 35 are provided on the outer circumferential surface 33 of the cylindrical cam 32, the pinion gear 42 with the pinion gear teeth 44 which mesh with the cylindrical cam teeth 35 is installed, and consequently a mode is formed so that the outer circumferential surface 33 of the cylindrical cam 32 (in other words, the cylindrical cam teeth 35) is to receive the driving force. Therefore, the distance, from the central axis that functions as a supporting point to the outer circumferential surface that functions as a point of action which receives power, becomes longer compared with the comparative example, so that less power is required for rotating the cylindrical cam 32. Therefore, in the present example, the superiority that the transfer stiffness for transmitting the driving force is increased can be obtained.

Also, with the cam device 10 of the present embodiment, the movable member 30 has the servo motor 52 for rotating the cylindrical cam 32 by driving the pinion gear 42, the axial direction of the central axis of the cam of the cylindrical cam 32 and the axial direction of the central axis of the motor of the servo motor 52 are along the row direction, and the shortest distance from the cam followers 22 to the central axis of the motor is larger than that from the cam followers 22 to the central axis of the cam. Therefore, physically larger motors can be used, so that the restrictions when selecting motors will be reduced.

Figure 6:
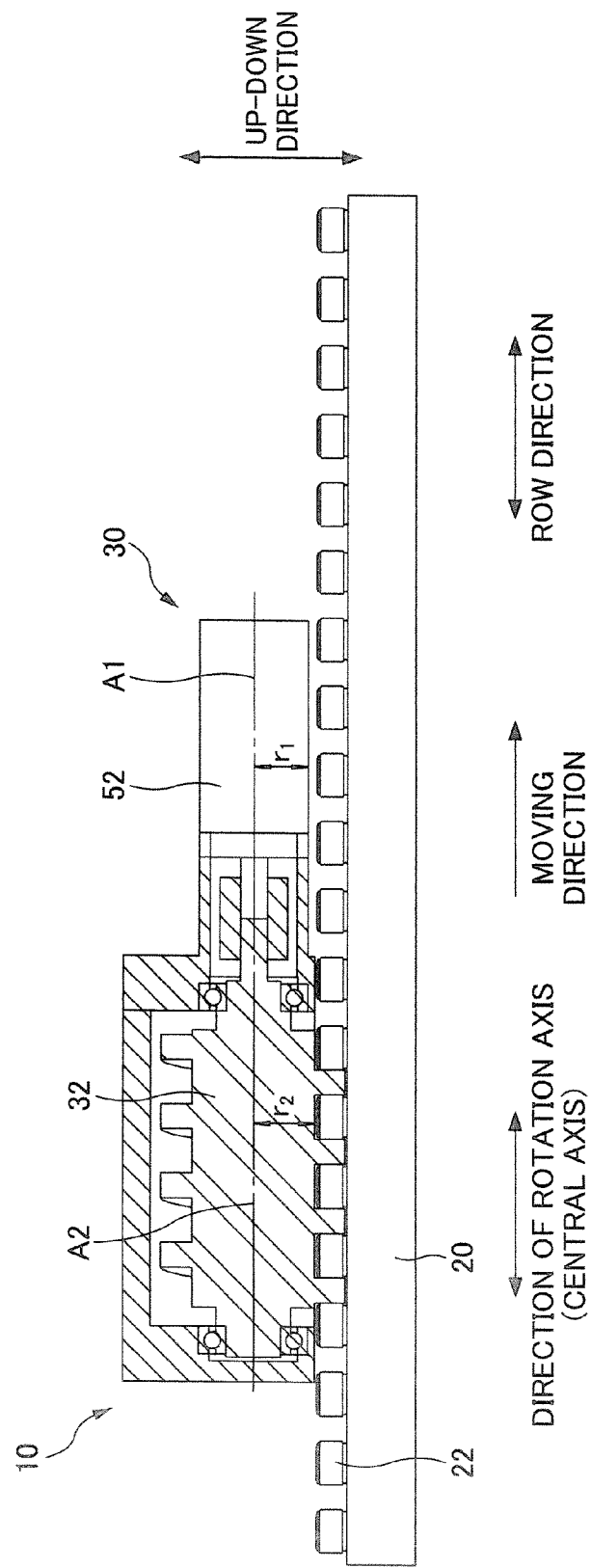
FIG. 6 is a cross-sectional view of a cam device 10 according to a second comparative example.

The above description will be explained using FIG. 6 by comparing the cam device 10 of the present embodiment (the present example) with the cam device 10 of the conventional example (referred to as a second comparative example). FIG. 6 corresponds to FIG. 3, and is a cross-sectional view of the cam device 10 of the second comparative example.

As shown in FIG. 6, with the cam device 10 of the second comparative example, as with the cam device 10 of the present embodiment, the movable member 30 includes the servo motor 52 for rotating the cylindrical cam 32, and the axial direction of the central axis of the cam of the cylindrical cam 32 and the axial direction of the central axis of the motor of the servo motor 52 are along the row direction.

However, with the cam device 10 of the second comparative example, different from the cam device 10 of the present embodiment, the pinion gear which is mounted in the present example is not provided, in addition, the shortest distance from the cam followers 22 to the central axis of the motor (shown by reference character A1 in FIG. 6) and the shortest distance from the cam followers 22 to the central axis of the cam (shown by reference character A2 in FIG. 6) are equal.

That is, as shown in FIG. 6, the cylindrical cam 32 of the second comparative example is not coupled to the servo motor 52 through the pinion gear, the first variable-speed gear, and the second variable-speed gear, but is directly coupled to the servo motor 52 coaxially. Thus, the central axis of the cam of the cylindrical cam 32 and the central axis of the motor of the servo motor 52 are matched with each other. Therefore, the shortest distance from the cam followers 22 to the central axis of the motor and that from the cam followers 22 to the central axis of the cam, are made equal.

That is, when comparing the present example with the second comparative example, in the present example, the shortest distance from the cam followers 22 to the central axis of the motor is larger that that from the cam followers 22 to the central axis of the cam. However, in the second comparative example, the shortest distance from the cam followers 22 to the central axis of the motor is equal to that from the cam followers 22 to the central axis of the cam.

Due to such a difference, the present example has superiority over the second comparative example. That is, in the second comparative example, since the shortest distance from the cam followers 22 to the central axis of the motor is equal to that from the cam followers 22 to the central axis of the cam, when taking into consideration that the servomotor 52 is made to not physically interfere with cam followers 22, the radius of the servo motor 52 (shown by the reference character $r_1$ in FIG. 6) needs to be made smaller than the shortest distance from the cam followers 22 to the central axis of the cam (shown by the reference character $r_2$ in FIG. 6). Therefore, since physically large motors can not be used, the restriction when selecting motors is increased.

On the other hand, in the present example, since the shortest distance from the cam followers 22 to the central axis of the motor is larger than that from the cam followers 22 to the central axis of the cam, the radius of the servo motor 52 does not need to be made smaller than the shortest distance from the cam followers 22 to the central axis of the cam. Therefore, physically larger motors can be used compared with the second comparative example, so that the restriction when selecting motors will be reduced.

As described above, in the present example, as shown in FIG. 1, the cylindrical cam teeth 35 are provided on the outer circumferential surface 33 of the cylindrical cam 32, and also the pinion gear 42 having the pinion gear teeth 44 that mesh with the cylindrical cam teeth 35 is installed. Consequently, it also becomes possible to make the shortest distance from the cam followers 22 to the central axis of the motor larger than the shortest distance from the cam followers 22 to the central axis of the cam. Therefore, the cam device 10 of the present example is adapted to solve the problem relating to the transfer stiffness in the first comparative example and the problem relating to the restriction when selecting motors in the second comparative example at once.

===Regarding Other Configurations of the Cam Device 10===

Figure 7:
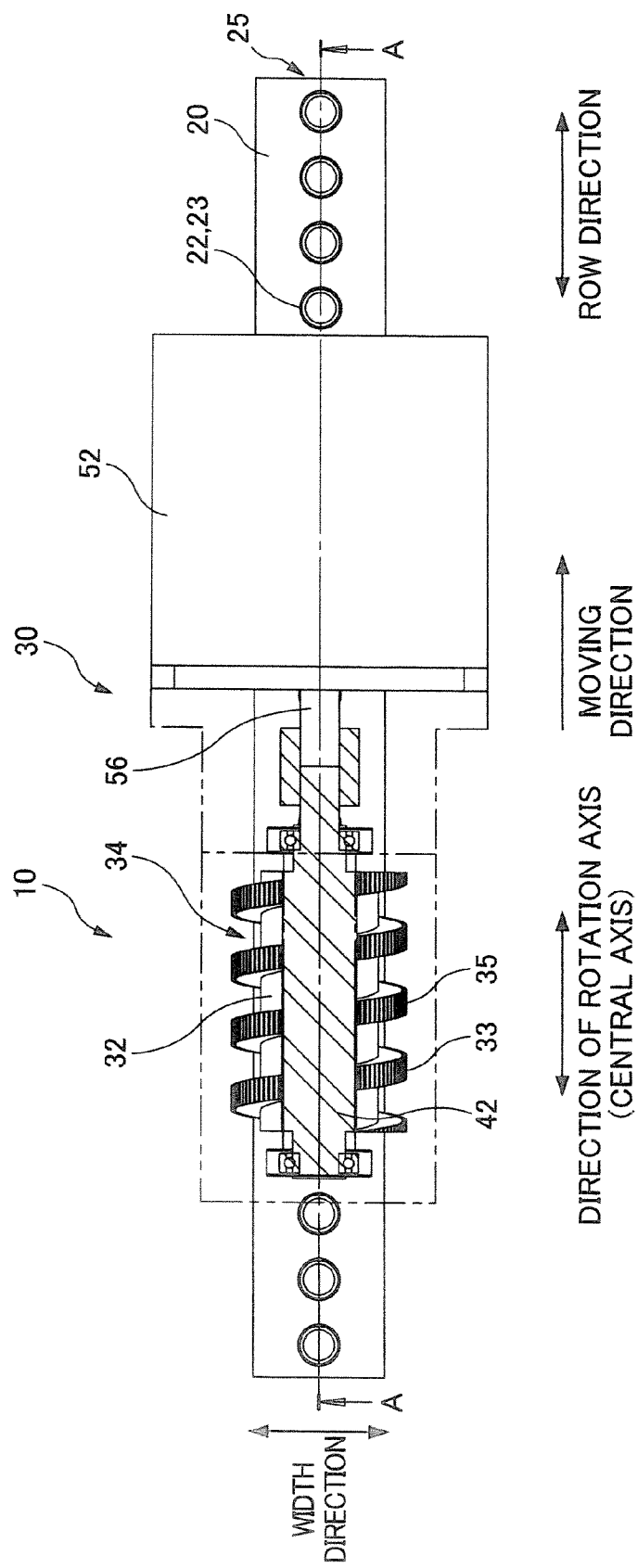
FIG. 7 is a top view of a cam device 10 according to a second embodiment.
Figure 8:
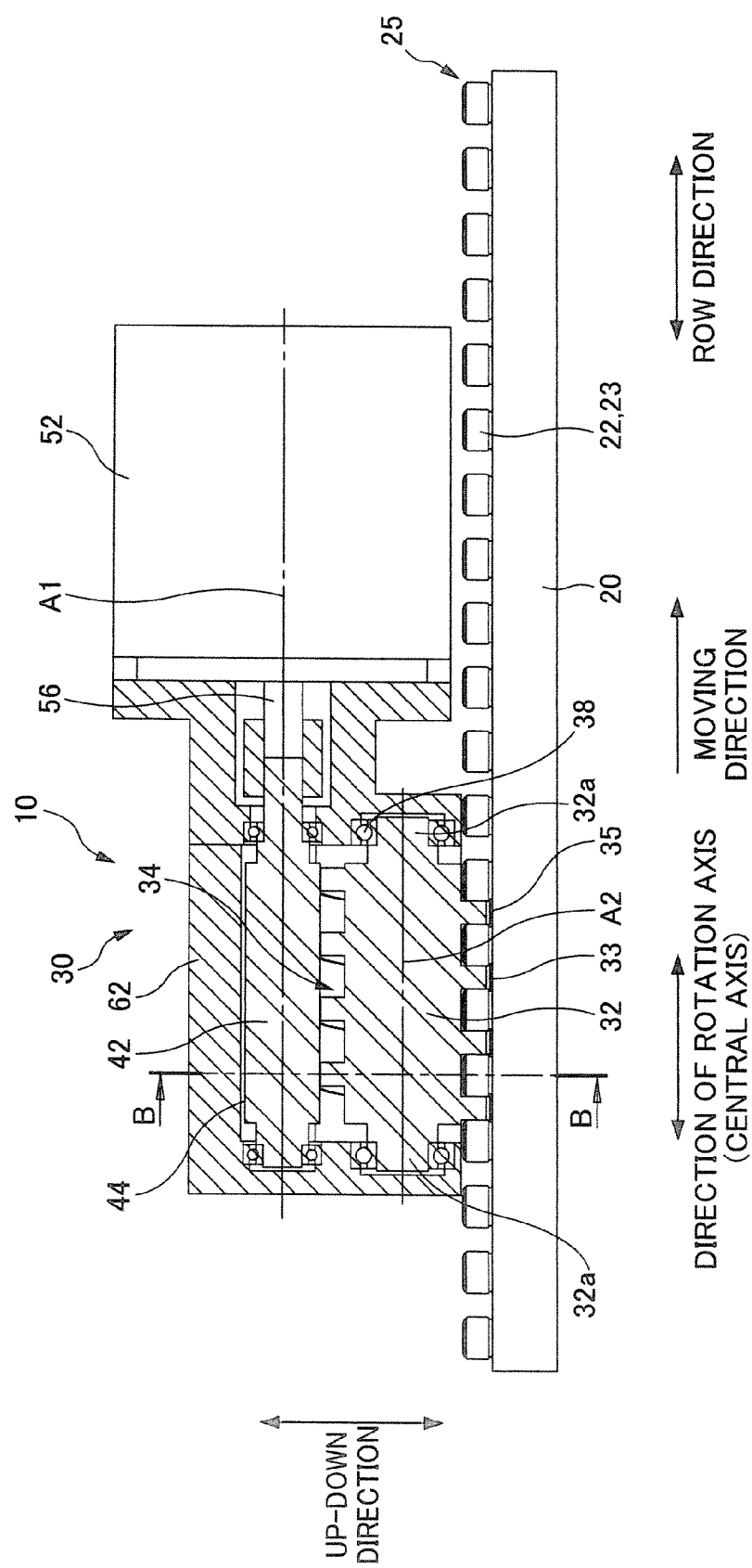
FIG. 8 is a cross-sectional view taken along line A-A in FIG. 7.
Figure 9:
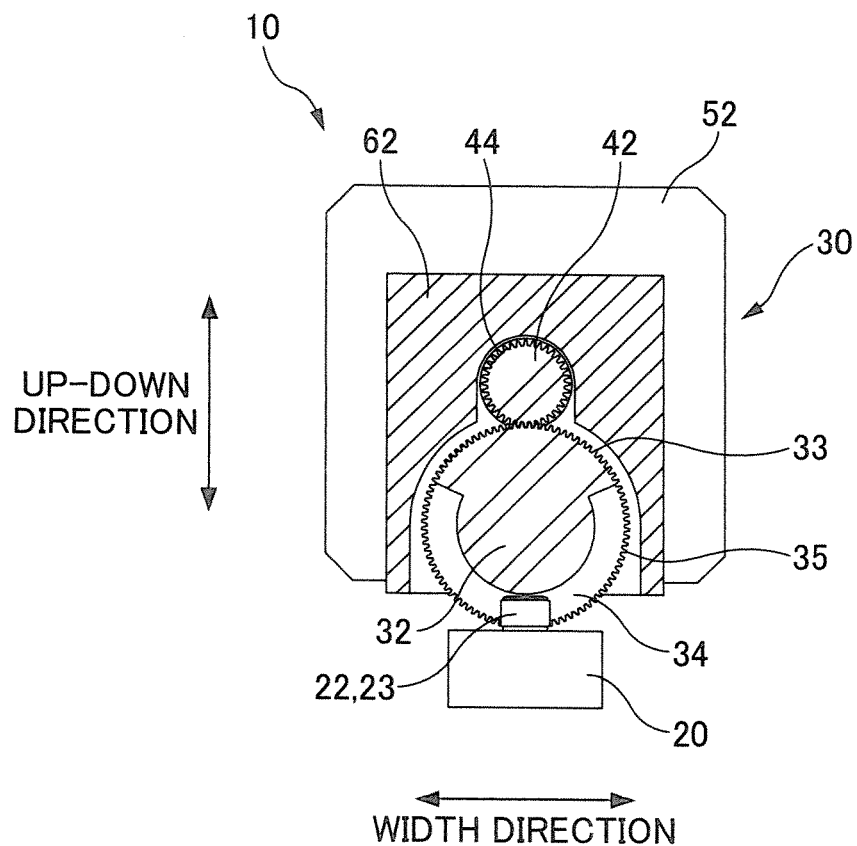
FIG. 9 is a cross-sectional view taken along line B-B in FIG. 8.
Figure 10:
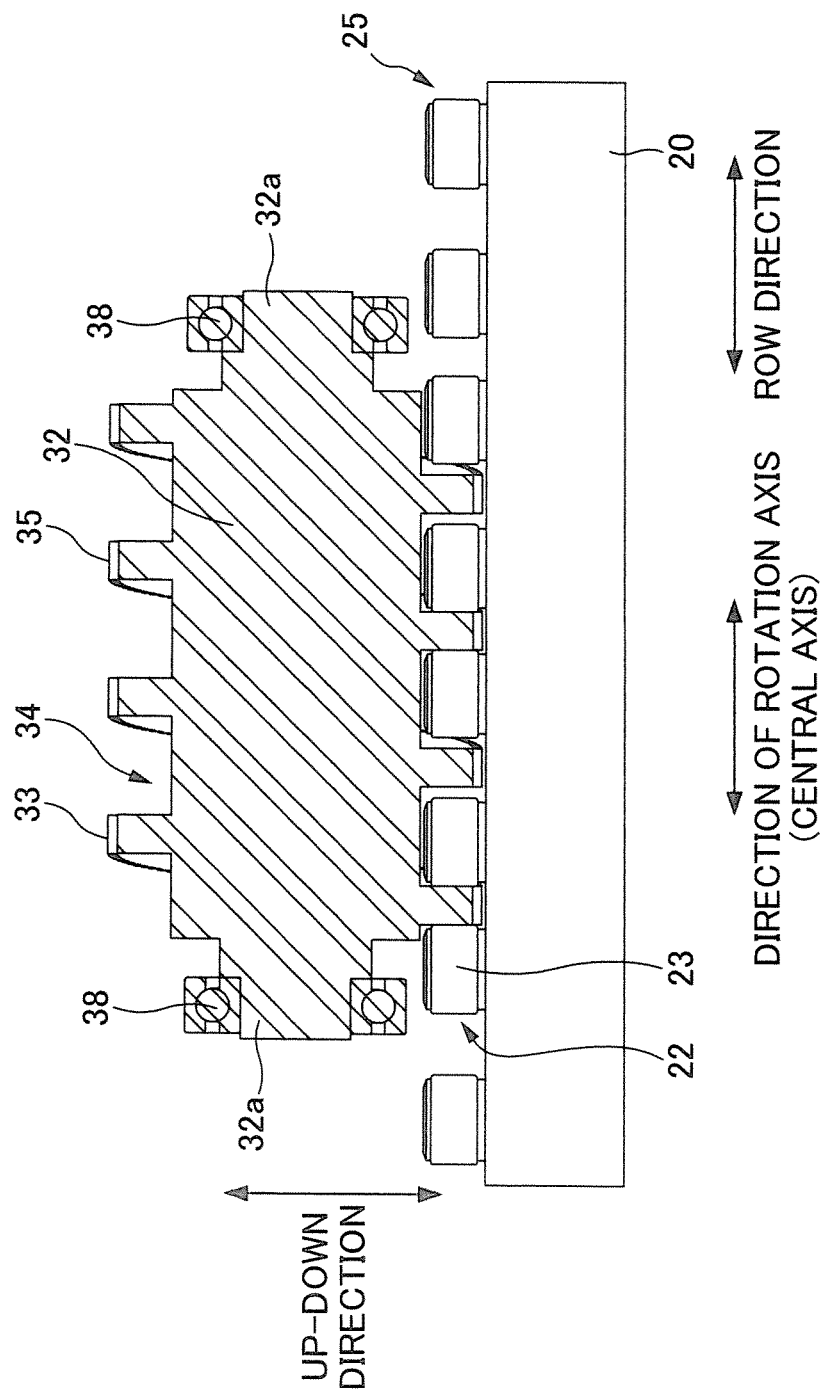
FIG. 10 is an enlarged view of an enlarged cylindrical cam 32 of FIG. 8.

Next, another embodiment (referred to as a second embodiment) of the cam device 10, which is different from the above-mentioned embodiment (referred to as a first embodiment), will be described using FIGS. 7 to 10. FIG. 7 is a top view of the cam device 10 of the second embodiment. FIG. 8 is cross-sectional view taken along line A-A in FIG. 7. FIG. 9 is a cross-sectional view taken along line B-B in FIG. 8. FIG. 10 is an enlarged view enlarging a cylindrical cam, 32 of FIG. 8. Note that, in these figures, structural components corresponding to those of the cam device in the first embodiment are denoted by the same reference characters and the description thereof will be omitted.

The second embodiment has mainly four points which are different from the first embodiment: a point regarding the configuration of the cam followers 22 (a first difference), a point relating to the cylindrical cam teeth 35 and the pinion gear teeth (a second difference), a point relating to the coupling configuration of the pinion gear 42 and the servo motor 52 (a third difference), and a point relating to the arrangement of the pinion gear (a fourth difference).

First, the first difference will be explained. In the first embodiment, as shown in FIGS. 1 and 2, two cam follower rows 25 (i.e., two rows) are provided that each include the plurality of cam followers 22 arranged in the row direction. That is, in the first embodiment, the cam followers 22 are configured to be a so-called multiple-row arrangement, therefore, the movable member 30 is a so-called multiple-row movable member (a multiple-row linear roller screw).

On the other hand, in the second embodiment, as shown in FIGS. 7 and 10, only one cam follower row 25 (i.e., one row) is provided. That is, in the second embodiment, the cam followers 22 are configured to be a so-called single-row arrangement, therefore, the movable member 30 is a so-called single-row movable member (a single-row linear roller screw).

That is, as shown in FIGS. 9 and 10, the top surface of the base 20 is not formed with such a groove provided on the base of the first embodiment, and the cam followers 22 are fixed in an erect state on the top surface so that the direction of the rolling axes of the cam followers 22 is along the up-down direction.

Next, the second difference will be explained. In the first embodiment, as shown in FIG. 1, the pinion gear 42 is not provided with the pinion gear teeth 44 on an entire surface. On the opposite end section of the first variable-speed gear 46 of the pinion gear 42 in the rotation axial direction (direction of the central axis), there is a pinion gear non-processed section 45 in which the pinion gear teeth 44 are not provided. Correspondingly, on the outer circumferential surface 33 of the cylindrical cam 32, the cylindrical cam non-processed section 36 exists in which neither the engaging grooves 34 nor the cylindrical cam teeth 35 is provided.

On the other hand, in the second embodiment, as shown in FIG. 7, the pinion gear 42 is provided with the pinion gear teeth 44 on the entire surface (therefore, there is no such pinion gear non-processed section that is included in the pinion gear according to the first embodiment). Correspondingly, the cylindrical cam teeth 35 are mounted on all of the sections that are not provided with the engaging groove 34 on the outer circumferential surface 33 of the cylindrical cam 32 (therefore, there is no such cylindrical cam non-processed section that is provided on the cylindrical cam of the first embodiment).

Next, the third difference will be explained. In the first embodiment, as shown in FIG. 1, the pinion gear 42 is coaxially coupled to the first variable-speed gear 46, and the servo motor 52 (more specifically, its output shaft 56) is coaxially coupled to the second variable-speed gear 54. The transmission of the driving force from the servo motor 52 to the pinion gear 42 is carried out through the first variable-speed gear 46 and the second variable-speed gear 54.

On the other hand, in the second embodiment, as shown in FIGS. 7 and 8, there is no first variable-speed gear and second variable-speed gear that are provided in the cam device in the first embodiment, and the pinion gear 42 and the servo motor 52 are coaxially provided through the output shaft 56 (i.e., the central axis of the pinion gear 42 and that of the servo motor 52 are matched). Therefore, the servo motor 52 is coupled to the output shaft 56, and the output shaft 56 is coaxially coupled to the pinion gear 42. These members (the servo motor 52, the output shaft 56, and the pinion gear 42) are mounted so that the axial direction of the central axis is along the row direction.

Next, the fourth difference will be explained. In the first embodiment, as shown in FIG. 2, the pinion gear 42 is mounted in a position that is not directly above the cylindrical cam 32 but is slightly displaced in the width direction and the downward direction from the directly above position (in other words, the engagement position in which the pinion gear teeth 44 and the cylindrical cam teeth 35 are meshed with each other is provided in a position that is not directly above the cylindrical cam 32, but is slightly displaced in the width and the downward direction from the directly above position).

On the other hand, in the second embodiment, as shown in FIGS. 8 and 9, the pinion gear 42 is mounted directly above the cylindrical cam. 32 (in other words, the engagement position, in which the pinion gear teeth 44 and the cylindrical cam teeth 35 are meshed with each other, is provided directly above the cylindrical cam 32). This is because, as can be understood from FIG. 8, in the second embodiment, considering that the pinion gear 42 and the servo motor 52 are coaxially mounted, the pinion gear 42 is positioned at the farthest position from the cam follower 22 (that is, the position in which the shortest distance from the cam follower 22 to the central axis of the pinion gear 42 becomes the largest distance), so that physically lager motors can be installed.

Furthermore, in such a second embodiment, as shown in FIGS. 7 to 10, the movable member 30 includes the pinion gear 42 that engages with the cylindrical cam 32 so as to rotate the cylindrical cam 32. Since the cylindrical cam teeth 35 meshing with the pinion gear teeth 44 of the pinion gear 42 are provided on the outer circumferential surface 33 of the cylindrical cam 32, the aforementioned effect that the cam device 10 with high transfer stiffness can be achieved becomes successful.

Also, in the second embodiment, the shortest distance from the cam follower 22 to the central axis of the motor (shown by reference character A1 in FIG. 8) is larger than that from the cam follower 22 to the central axis of the cam (shown by reference character A2 in FIG. 8). Therefore, physically large motors can be used, and the aforementioned effect that the restriction when selecting motors is reduced can be achieved.

===Regarding a Guide Member for Guiding Movement of a Movable Member 30===

As stated above, the cam device 10 in which the movable member 30 moves with respect to the base 20 is described, but it is also necessary to provide a guide member for guiding the movement in order to move the movable member 30 smoothly.

First, the guide member according to the conventional example will be explained using FIGS. 11 and 12 below. Then, the guide member of the present embodiment (the present example) will be explained using FIGS. 13 to 15. Following that, superiority of the present example over the conventional examples will be described.

Figure 11:
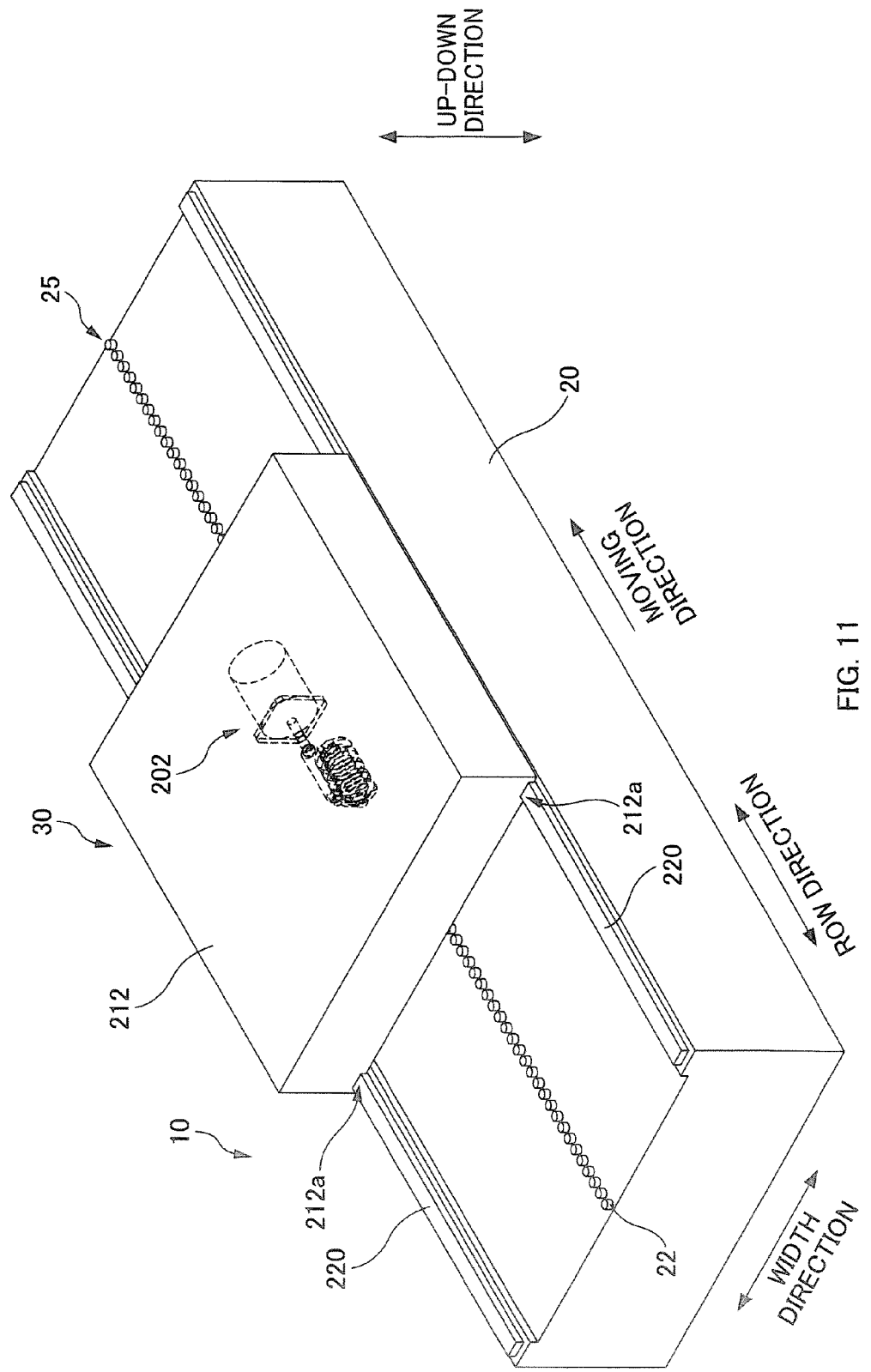
FIG. 11 is a first schematic view for explaining guide members according to a conventional example.
Figure 13:
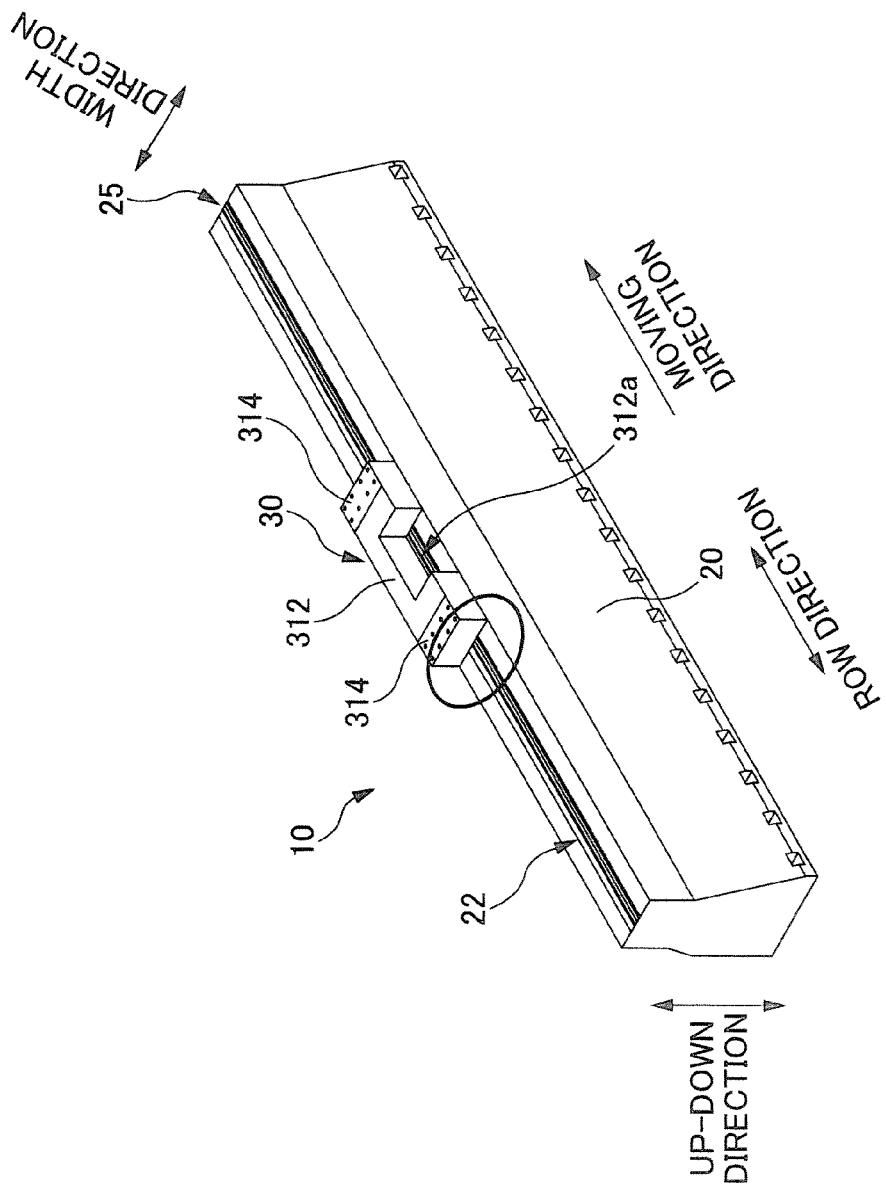
FIG. 13 is a schematic view for explaining guide members according to the present example.
Figure 14:
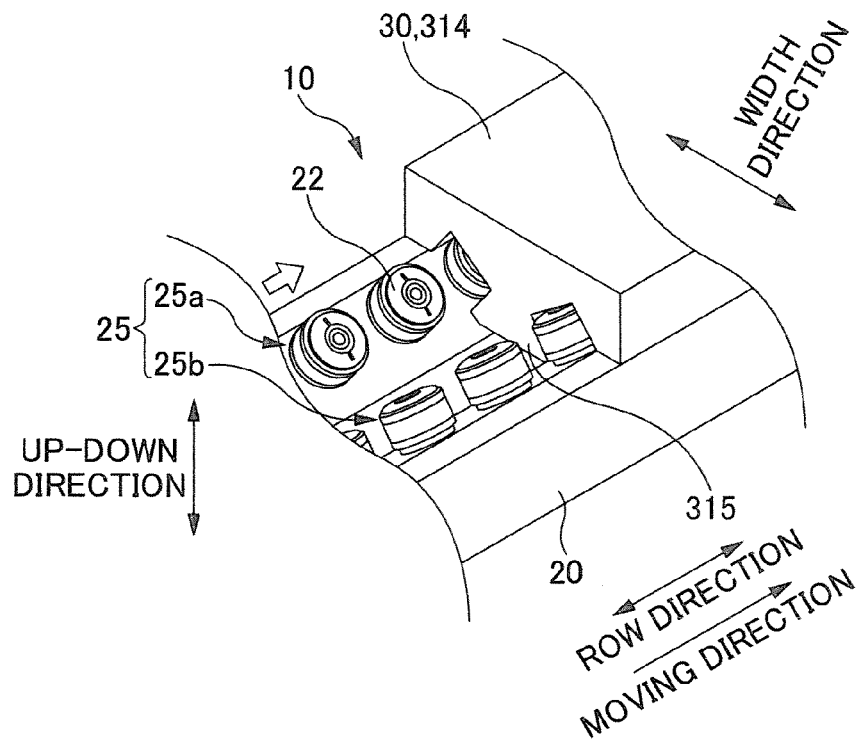
FIG. 14 is a partially enlarged view of FIG. 13.
Figure 15:
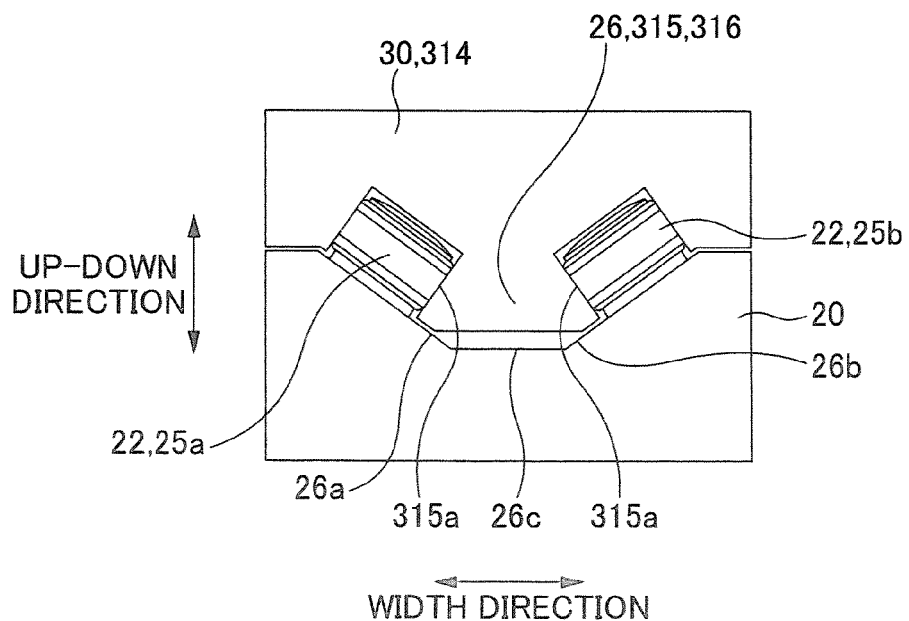
FIG. 15 is a view of the cam device 10 viewed from a direction shown by a white arrow in FIG. 14.

FIG. 11 is a first schematic view for explaining guide members of the conventional example. FIG. 12 is a second schematic view explaining the guide members of the conventional example. FIG. 13 is a schematic view explaining guide members of the present example. FIG. 14 is a partially enlarged view of FIG. 13. FIG. 15 is a view of the cam device 10 viewed from the direction shown by a white arrow in FIG. 14.

First, FIG. 11 will be explained. As shown in FIG. 11, the movable member 30 has as well as a linear roller screw 202, a rectangular-parallelepiped-shaped housing 212 for receiving the linear roller screw 202. On the bottom surface of the housing 212 and in both end sections in a width direction of the housing 212, groove sections 212*a* are provided along the row direction.

On the other hand, in the positions corresponding to the groove sections 212*a* of the base 20, guide rails 220 are provided as guide members for guiding the movement of the movable member 30. That is, this guide rail 220 is along the row direction and is arranged in both end sections in the width direction of the base 20. The guide rails 220 are provided on the top surface of the base 20 to form a projection upwardly projected from the top surface.

When the movable member 30 moves with respect to the base 20, the movable member 30 moves in a state that groove sections 212*a* are fitted to the guide rails 220, so that the movable member 30 is guided by the guide rails 220.

Figure 12:
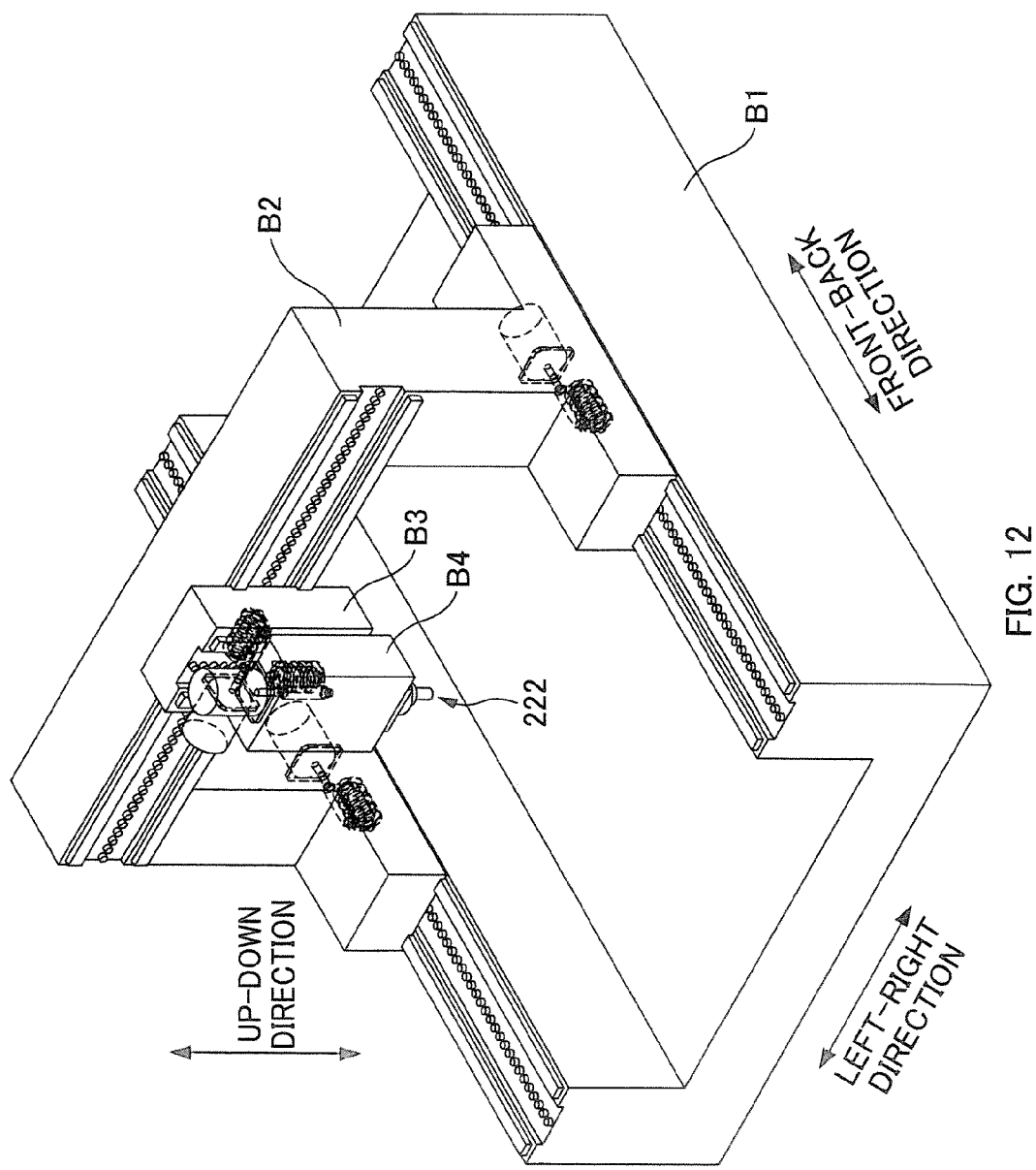
FIG. 12 is a second schematic view for explaining guide members according to the conventional example.

In FIG. 12, a machine tool is shown in which a plurality of cam devices 10 having the base 20 and the movable member 30 shown in FIG. 11 are combined so as to be able to move a tool 222 in the front-back, left-right and up-down directions. That is, the movement in the front-back direction of the tool 222 can be achieved by the cam device 10 in which the member shown by reference character B1 corresponds to the base 20 and the member shown by reference character B2 corresponds to the movable member 30, respectively. Also, the movement in the left-right direction of the tool 222 can be achieved by the cam device 10 in which the member shown by reference character B2 corresponds to the base 20 and the member shown by reference character B3 corresponds to the movable member 30, respectively. In addition, the movement in the up-down direction of the tool 222 can be achieved by the cam device 10 in which the member shown by the reference character B3 corresponds to the base 20, and the member shown by reference character B4 corresponds to the movable member 30, respectively. As can be clearly understood from FIG. 12, all of these three cam devices 10 include the above-mentioned groove sections 212*a* and the guide rails 220, and the movable member 30 is guided by the guide rails 220.

Note that, in FIGS. 11 and 12, while the cam device 10 corresponding to the second embodiment described above is shown, the guide member described above can be applied even when the cam device 10 corresponds to the first embodiment.

Next, the guide member of the present example will be described. As shown in FIG. 13, as with the example of FIG. 11, the movable member 30 includes as well as a linear roller screw, a rectangular-parallelepiped-shaped housing 312 for receiving the linear roller screw. Note that, in FIG. 13, while the illustration of the linear roller screw is omitted, the linear roller screw is received and fixed in a notched section 312*a* of the housing 312.

Also, on both ends in the longitudinal direction of the housing 312, members with a fitting projection 315 that fits into a guide groove 316 described later (see FIGS. 14 and 15) are fixed (for convenience of description, the members are referred to as guided sections 314). As shown in FIGS. 14 and 15, the fitting projection 315 is provided on the bottom surface of the guided section 314 and in the central section in a width direction of the guided section 314, and projects downwardly.

On the other hand, the configuration of the base 20 is the same as the previously mentioned configuration of the cam device 10 of the first embodiment. That is to say, as shown in FIGS. 14 and 15, the base 20 includes two cam follower rows 25 (i.e., two rows), and the cam followers 22 are configured to be arranged in multiple rows. On the upper surface of the base 20, a groove 26 that includes two lateral sections (a first lateral section 26a and a second lateral section 26b) and a bottom section 26c is formed, and a first cam follower row 25a (cam followers 22 belonging thereto) and a second cam follower row 25b (cam followers 22 belonging thereto) are fixed in an erect state on the two lateral sections (the first lateral section 26a and the second lateral section 26b), respectively.

The fitting projection 315 of the guided section 314 described above, as shown in FIG. 15, is fitted in a space between the first cam follower row 25a (the cam followers 22 belonging thereto) and the second cam follower row 25b (the cam followers 22 belonging thereto). More specifically, a section of the groove 26, which is positioned between the first cam follower row 25a (the cam followers 22 belonging thereto) and the second cam follower row 25b (the cam followers 22 belonging thereto) functions as a guide groove 316 that is as a guide member for guiding the movement of the movable member (the guided section 314).

In this way, in the position of the base 20 corresponding to the fitting projection 315, a guide groove 316 is provided. This guide groove 316 is along the row direction and is arranged in a center section in the width direction of the base 20.

Moreover, when the movable member 30 moves with respect to the base 20, the movable member 30 is guided by the guide groove 316 by making the movable member 30 move in a state that the fitting projection 315 is fitted into the guide groove 316. In other words, when the movable member 30 moves, the fitting projection 315 is sandwiched between the two cam follower rows 25, so that the movable member 30 is guided by the two cam follower rows 25.

Thus, with the guide members of the present example, the two cam follower rows 25 guide the relative movement of the movable member 30. Therefore, in the present example, the two cam follower rows 25 have both functions to move the movable member 30 by the cooperation with the cylindrical cam 32, and to guide the movable member 30 (the two cam follower rows 25 for moving the movable member 30 also function as a guide). Therefore, the cam device 10 with an efficient configuration can be achieved.

OTHER EMBODIMENTS

Above, based on the above embodiments, a cam device and the like of the present invention is described, but the above embodiments of the invention are for facilitating understanding the invention, and are not limiting of the invention. The invention can of course be altered and improved without departing from the gist thereof, and equivalents are intended to be embraced therein.

Also, in the above description, the second member with the linear roller screw moves, and the other first member does not move, but this is not a limitation. For example, a configuration may also be adopted in which the second member with the linear roller screw does not move, but the other first member moves.

Figure 16:
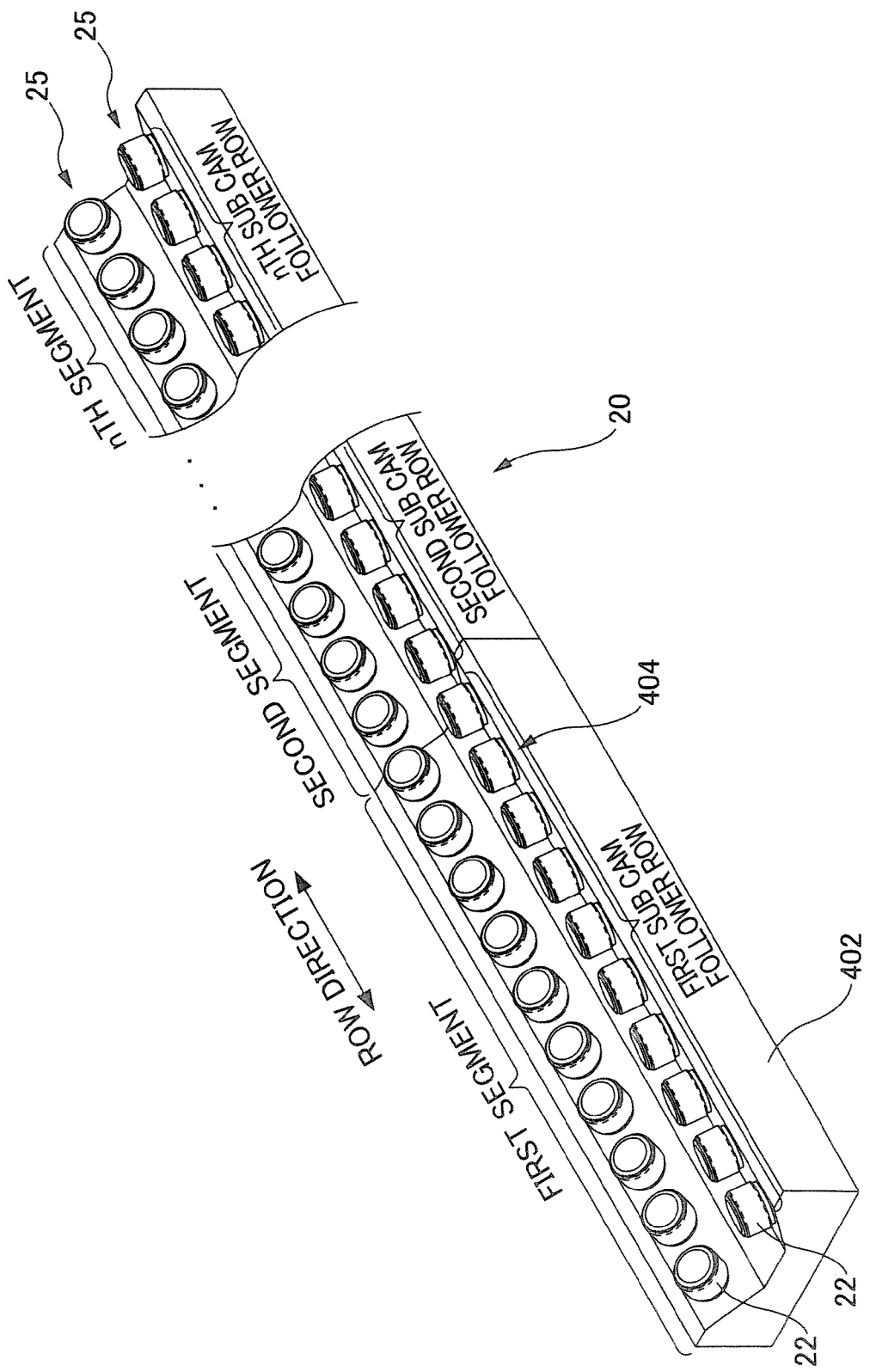
FIG. 16 is a view showing abase 20 configured to be divisible into a plurality of segments 402 (in a case of an arrangement having multiple rows)
Figure 17:
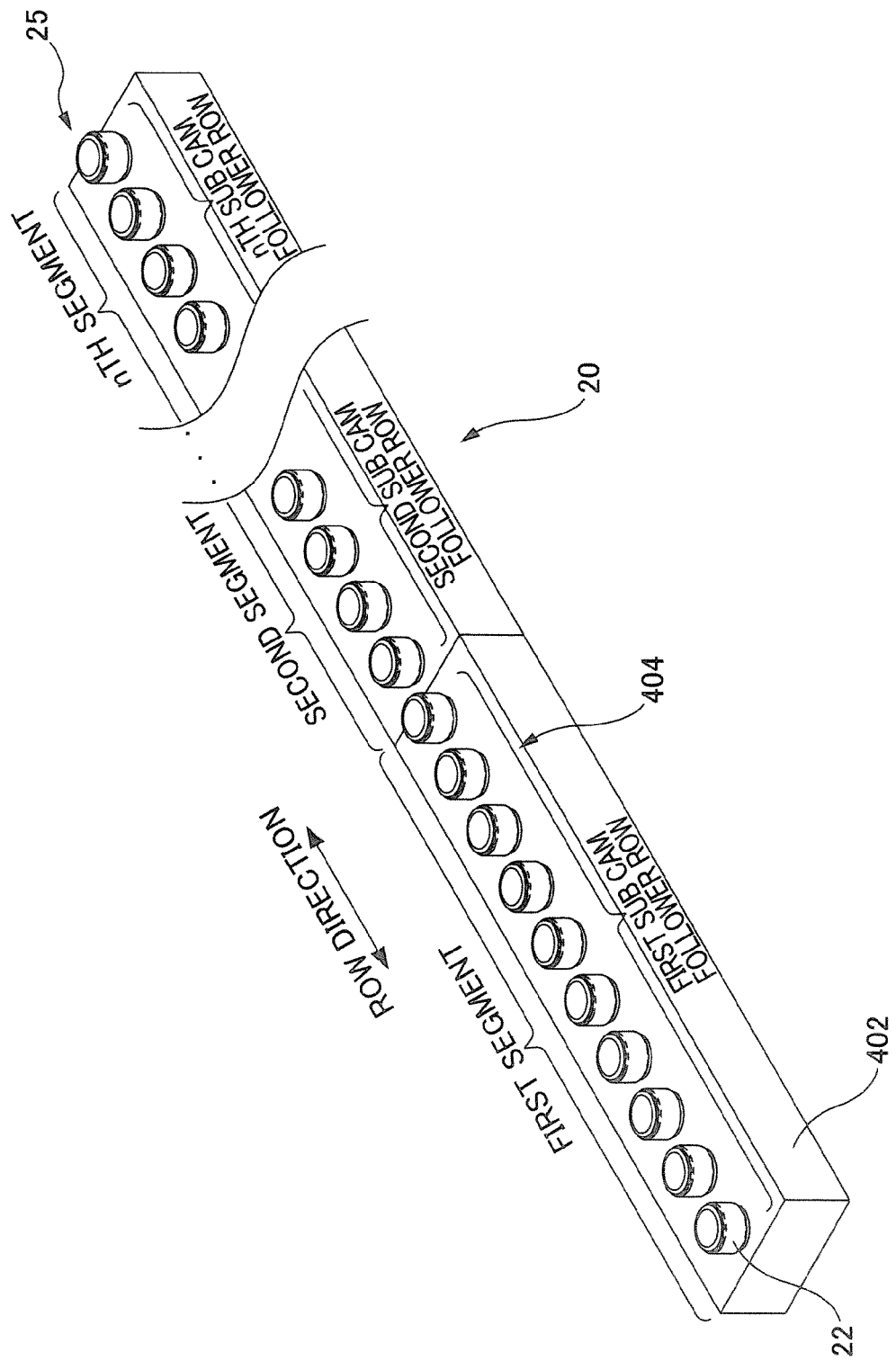
FIG. 17 is a view showing a base 20 configured to be divisible into a plurality of segments 402 (in a case of an arrangement having a single row).

Also, the base 20 may be configured to be divisible into a plurality of segments 402. Such configuration will be explained using FIGS. 16 and 17. FIGS. 16 and 17 show state in which the base 20 is configured to be divisible into the plurality of segments 402. FIG. 16 corresponds to a case in which the cam followers 22 are configured to be arranged in multiple rows, and FIG. 17 corresponds to a casein which the cam followers 22 are configured to be arranged in a single row, respectively.

As shown in FIGS. 16 and 17, in the present embodiment, the base 20 is configured to be divisible into N number of the segments 402. Each of the segments 402 has a sub cam follower row 404 which is a part of the cam follower row 25. For example, as shown in FIG. 17, the cam follower row 25 includes N number of sub cam follower rows 404 connected in series in the row direction.

That is, each segment 402 is aligned (i.e., is connected) in such a manner that the row direction of the sub cam follower row 404 is along the row direction of the cam follower row 25 (in other words, the moving direction of the movable member), and thereby the base 20 is formed.

Note that, in the present embodiment, considering simplification of producing the segments, each segment 402 is configured to include a sub cam follower row 404 having ten (the same number of) cam followers 22. However, this is not a limitation, and the plurality of segments 402 may include some segments 402 each of which has a different number of cam followers 22.

With such a divisible configuration of the base 20 as described above, superiority mentioned below will be obtained. That is to say, in the case that the base 20 cannot be divided into the plurality of segments 402, it is necessary to produce a base 20 with a length in response to the purchaser's demands in each case. Additionally, when the demands is suddenly changed (i.e., when any design changes suddenly occur), an immediate response, such as giving up the base 20 that is being produced and producing a new base 20 with a different length, is, difficult.

On the other hand, in the present embodiment, the segments 402 may be produced regardless of the demand from the purchaser, and also, when the demand is suddenly changed (i.e., when any design changes suddenly occur), it is possible to immediately respond to the demand by decreasing or increasing the number of the segments 402 which are to be arranged (connected). That is, in the present embodiment, it is possible to provide the flexible base 20.

What is claimed is:

1. A cam device comprising:
   a first member including two cam follower rows each having a plurality of cam followers arranged in a row direction; and
   a second member including a linear roller screw and a housing for receiving the linear roller screw, the linear roller screw being provided with a rotatable cam having an engaging groove, on an outer circumferential surface thereof, to be engaged with the cam followers, the second member moving relatively with respect to the first member in the row direction by rotating the cam and making the plurality of the cam followers engage successively in the engaging groove,
   wherein the second member includes a gear that rotates the cam by engaging with the cam,
   second teeth that mesh with first teeth of the gear are provided on the outer circumferential surface of the cam, the housing is provided with a fitting projection being sandwiched between the two cam follower rows and being fitted in a space between the two cam follower rows, and the two cam follower rows guide the relative movement of the second member by allowing the second member to move in a state that the fitting projection is fit in the space between the two cam follower rows.

2. The cam device according to claim 1, wherein the second member includes a motor to rotate the cam by driving the gear, an axial direction of a central axis of the cam and an axial direction of a central axis of the motor are along the row direction, and a shortest distance from the cam followers to the central axis of the motor is larger than that from the cam followers to the central axis of the cam.

3. The cam device according to claim 1, wherein the first member is configured to be divisible into a plurality of segments, and each of the plurality of segments includes sub cam follower rows which are a part of the cam follower rows.

* * * * *